United States Patent
Scott et al.

(10) Patent No.: US 6,891,938 B1
(45) Date of Patent: May 10, 2005

(54) CORRELATION AND ENRICHMENT OF TELEPHONE SYSTEM CALL DATA RECORDS

(75) Inventors: Alistair K C Scott, Gaithersburg, MD (US); Anthony Musgrave, North Bethesda, MD (US); Maurice Lampell, Holmdel, NJ (US)

(73) Assignee: Agilent Technologies, Inc., Palo Alto, CA (US)

(*) Notice: Subject to any disclaimer, the term of this patent is extended or adjusted under 35 U.S.C. 154(b) by 581 days.

(21) Appl. No.: 09/707,539

(22) Filed: Nov. 7, 2000

(51) Int. Cl.[7] .............................................. H04M 15/00
(52) U.S. Cl. ............................ 379/112.06; 379/112.01; 379/114.04; 379/114.28; 379/133
(58) Field of Search ............................ 379/111, 112.01, 379/112.06, 112.07, 112.08, 112.09, 114.01, 114.03, 114.28, 114.29, 115.01, 121.01, 121.05, 121.06, 123, 126, 127, 133, 134, 137, 140, 114.04, 115.03, 121.04, 127.04, 127.05, 127.06

(56) References Cited

U.S. PATENT DOCUMENTS

| | | | | |
|---|---|---|---|---|
| 5,438,570 A | * | 8/1995 | Karras et al. ................ | 370/426 |
| 5,592,530 A | * | 1/1997 | Brockman et al. ....... | 379/32.03 |
| 5,729,588 A | * | 3/1998 | Chin et al. .................... | 379/14 |
| 5,802,142 A | * | 9/1998 | Browne ........................ | 379/28 |
| 6,385,444 B1 | * | 5/2002 | Peschel et al. .............. | 455/405 |
| 6,411,604 B1 | * | 6/2002 | Brockman et al. .......... | 370/244 |

* cited by examiner

*Primary Examiner*—Quoc Tran

(57) ABSTRACT

Methods to correlate call data records in a telephone or other communication system. A combination of parameter values in the data records and timestamps associated with some of the parameters can be used for such correlation. The information available within a single call record has limitations due to the fact that critical routing information may be (a) missing or (b) incorrect. Correlation of call detail records obtained from various communication segments provides the ability to mutually enrich the records so as to increase billing accuracy, as well as to enhance the detection of call mis-routing and perform traffic analysis.

20 Claims, 11 Drawing Sheets

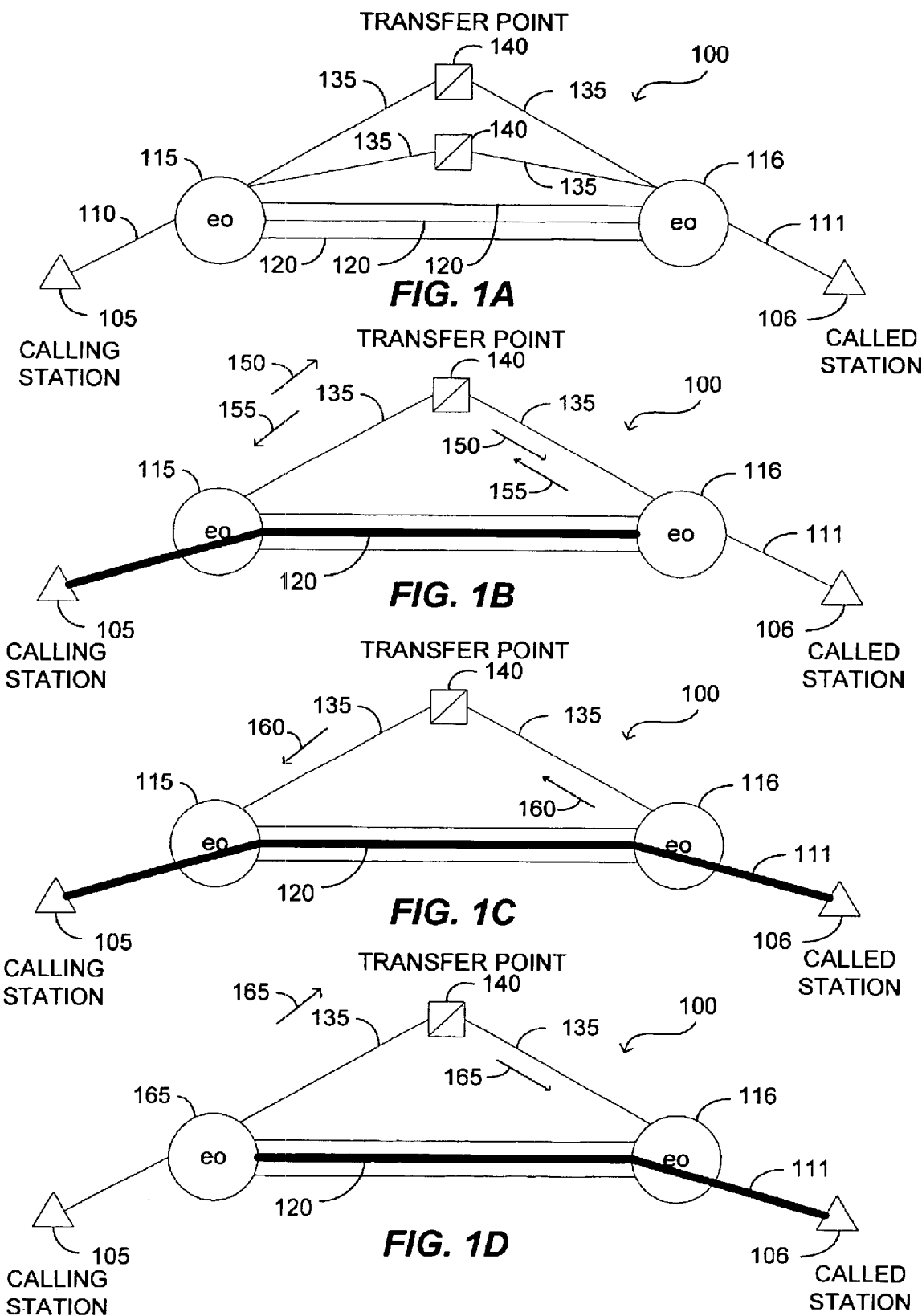

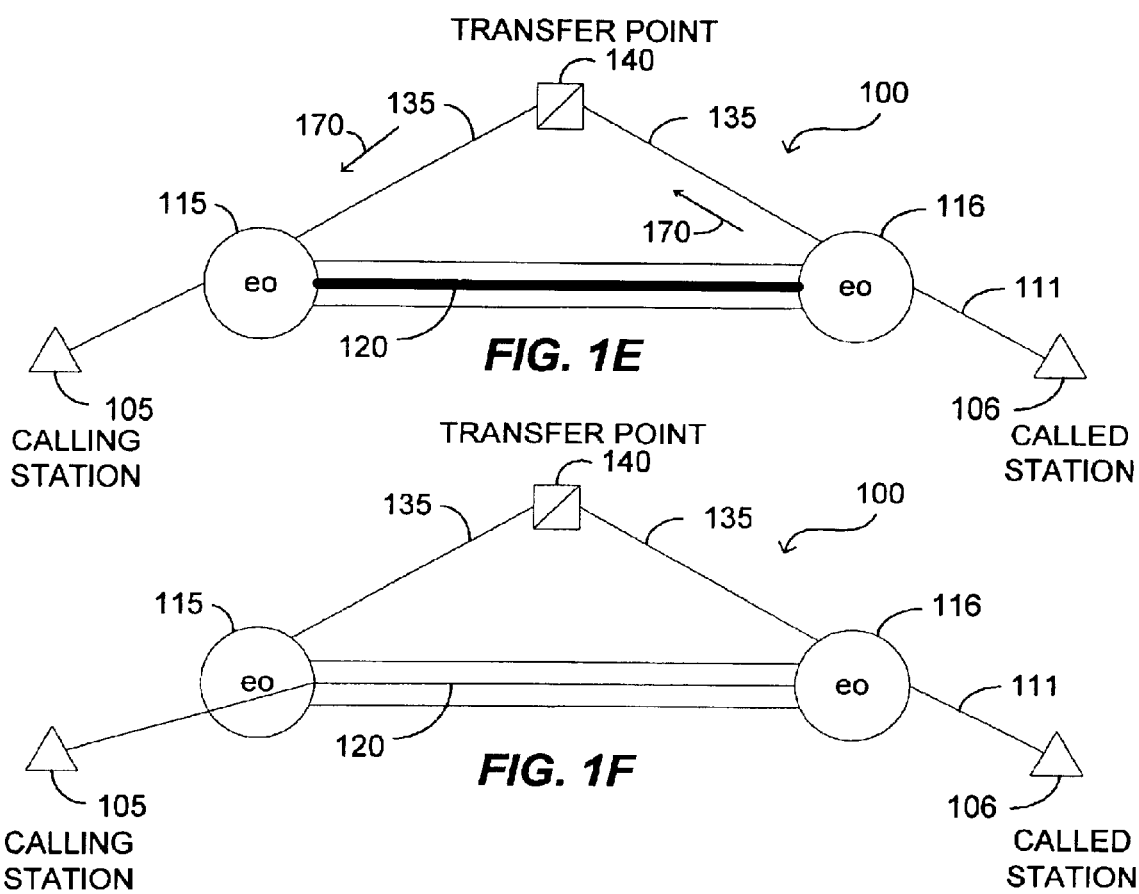

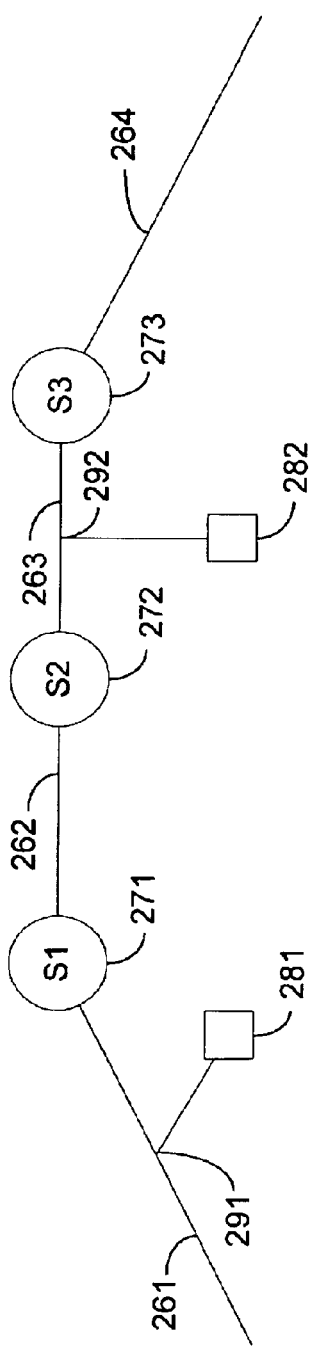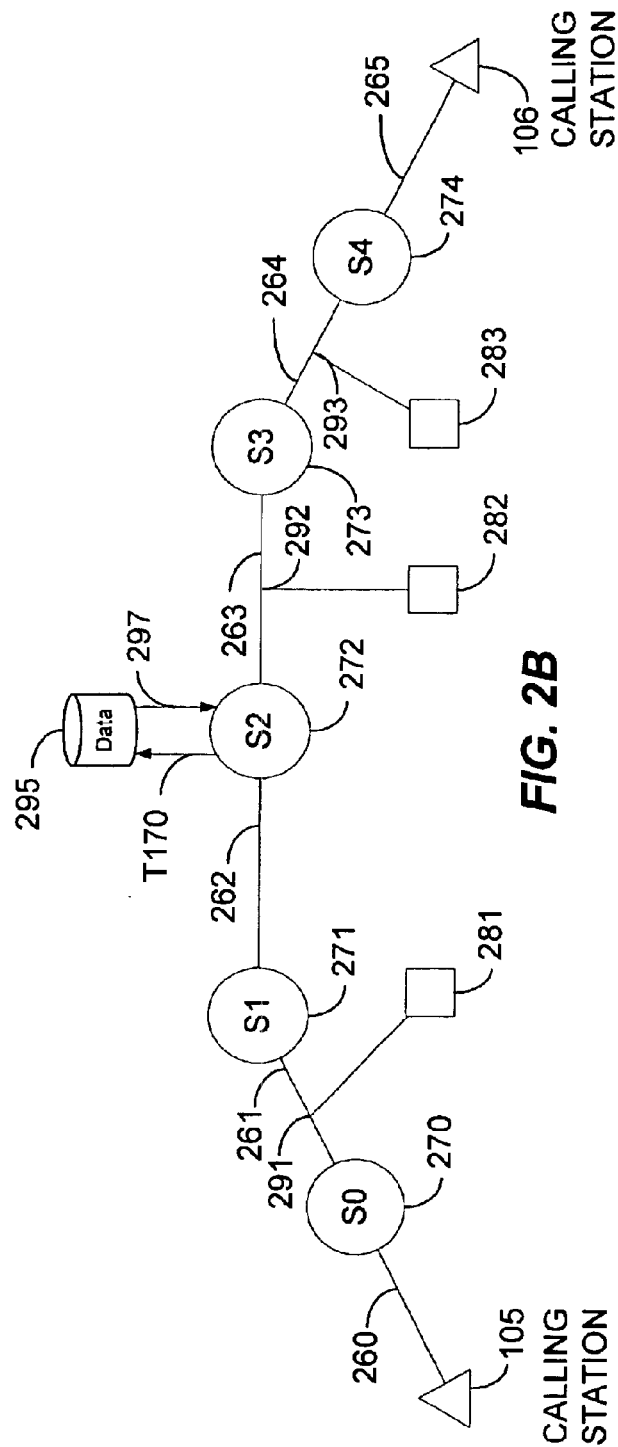
FIG. 2A
FIG. 2B

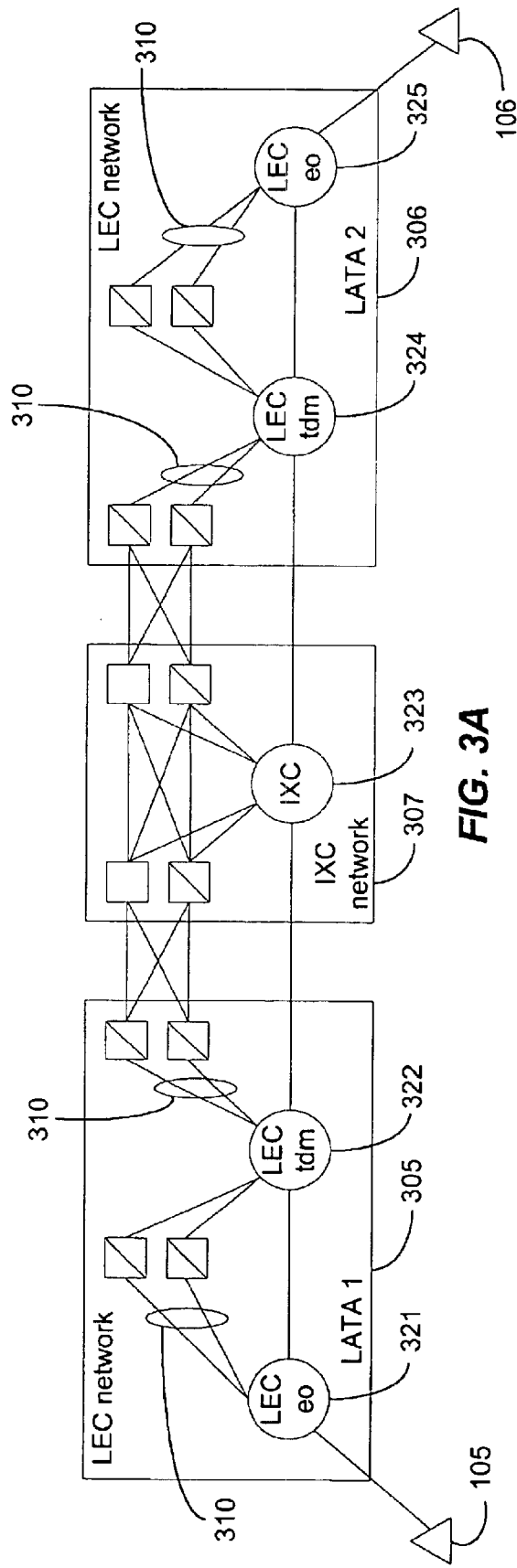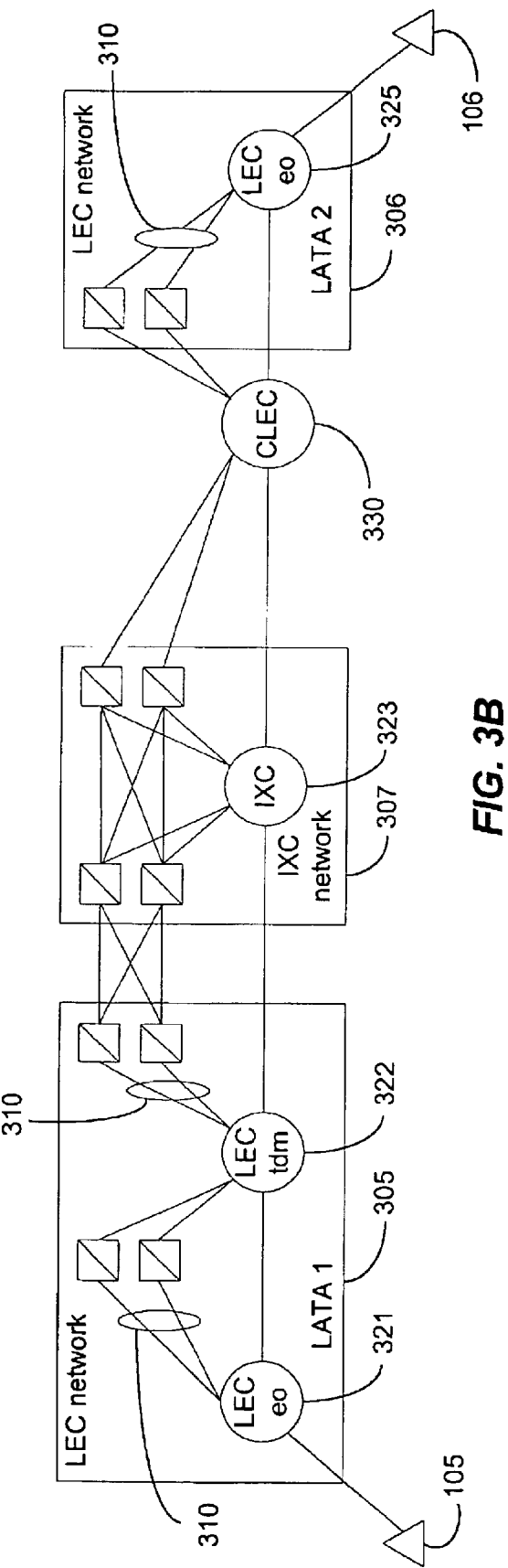
FIG. 3A
FIG. 3B

CORRELATION AND ENRICHMENT OF TELEPHONE SYSTEM CALL DATA RECORDS

FIELD OF THE INVENTION

The present invention relates generally to telephone systems and, more particularly, to the correlation of calling records.

BACKGROUND OF THE INVENTION

1. Introductory Remarks:

In the telephone system post-divestiture environment, complex regulatory tariffs have been mandated and/or inter-carrier contracts have been negotiated between carriers which (a) regulate the way in which traffic is to be routed between them and (b) specify the rates at which various types of traffic are to be charged. It is often of financial advantage to mis-route calls in violation of these existing regulatory tariffs and/or established inter-carrier contracts. The common name for this manipulation is "arbitrage". The intent of those perpetrating this mis-routing is to take advantage of lower rates associated with the delivery of telephone traffic via other than the proper routes. Confirming the presence of arbitrage and proper billing is often difficult due to the fact that call routing information is often missing or incomplete.

2. Definitions:

In general, the following definitions are common in the telephone industry, but are included herein for completeness and clarity of explanation. They define the meanings of these terms as used in the Present Patent Document.

Access Traffic—

A compensation mechanism governed by tariffs and/or contracts for message traffic carried by interexchange carriers (IXC) and exchanged between the IXC's and local exchange carriers (LEC's), independent local exchange carrier (ILEC's), and competitive local exchange carrier (CLEC's). This type of traffic is generally carried over a type of telephone trunk called a Feature Group D trunk or FG-D trunk, and typically carries the highest per-minute charge. Under access traffic, IXC's pay the other carriers for each Minute of Use (MOU) of traffic destined to the IXC or originating from the IXC.

ACM Timestamp—The time at which the telephone being called began alerting the user (e.g. ringing).

Address Complete Message (ACM)—

The Address Complete Message (ACM) is used to acknowledge receipt of an initial address message (IAM) and to indicate that the called party is being alerted (e.g. via ringing).

ANM Timestamp—

The time the operator of the telephone being called answered the telephone.

Answer Message (ANM)—

The Answer Message (ANM) is used to indicate that the user called has answered, end to end connection is established, and a conversation takes place.

Arbitrage—

As used herein and as commonly used in the telephone industry, it is the mis-routing of inter-carrier telephone calls in such a way as to violate existing regulatory tariffs and/or established inter-carrier contracts. The purpose of such mis-routing is typically to take advantage of lower rates associated with the delivery of telephone traffic via routes other than those established and required by such tariffs and contracts and as such may be fraudulent. Arbitrage typically occurs via the following techniques: (1) interexchange carrier (IXC) access traffic delivered via competitive local exchange carriers (CLEC's) and (2) transit traffic delivered via non-transit trunks.

Backward Interwork Parameter—

An indicator as to whether Signaling System 7 (SS7) and non-SS7 inter-working was encountered ahead of this point in the call.

Call Detail Record (CDR)—

A collection of messages comprising parameters and time-stamps associated with each call which provide detail regarding the call origin, destination, and other details.

Called Number—

The telephone number dialed by the calling user.

Calling Number—

The telephone number of the user making the call.

Carrier Identification Code (CIC)—

Parameters contained within the Signaling System 7 (SS7) Initial Address Message (IAM) message which can be used to identify the requested interexchange carrier (IXC).

Carrier Identification Code Parameter—

The number identifying the interexchange carrier (IXC) selected by the Local Exchange Carrier.

Charge Number—

The telephone number to which the call is charged. Typically it is the telephone number of the calling telephone.

Competitive Local Exchange Carriers (CLEC)—

A local exchange carrier (LEC) but specifically referring to one that competes with the incumbent local exchange carrier (LEC).

Destination Point Code (DPC)—

The Signaling System 7 (SS7) node [e.g switching office or Signaling Transfer Point (STP)] that the message is being sent to.

eo—

A switching office normally referred to as an end office or "eo" to which telephones (from homes or businesses) are connected via wires called "loops".

Feature Group D Trunk (FG-D Trunk)—

A type of telephone trunk. See Access Traffic.

Forward Interwork Parameter—

An indicator as to whether Signaling System 7 (SS7) and non-SS7 inter-working was encountered prior to the point in the call where the parameter is observed.

IAM Timestamp—

The time the trunk was seized for transmission of an SS7 message.

Independent Local Exchange Carriers (ILEC)—

Generally refers to a local exchange carrier (LEC) which co-existed with a local exchange carrier owned by the Regional Bell Operating Companies.

Initial Address Message (IAM)—

The Initial Address Message (IAM) is used to indicate the desire to set up a call. A trunk is seized and "reserved" for use in the call.

Interconnect Carrier—

Any carrier that interconnects with the local exchange carrier (LEC).

Interexchange Carriers (IXC)—

An interexchange carrier (IXC) transports calls from one local exchange carrier (LEC) to another, or possibly the same LEC, throughout the IXC's serving area: The IXC's serving area would typically span more than one local access transport area (LATA), and the IXC receives messages from and delivers messages to local exchange carriers (LEC's, CLEC's, and ILEC's) and other interchange carriers (IXC's). Calls that span local area transport areas (LATA's—geographical regions defined at divestiture) typically must use an IXC.

IXC Trunk—
A trunk that comes from an interexchange carrier to a local exchange carrier.

Jurisdiction Indicator Parameter—
A parameter contained in SS7 messages which, if available, indicates the geographic origin of a call.

Link Monitoring System (LMS)—
A system that can be used to collect Call Detail Records (CDR's) by monitoring SS7 links.

Local Access Transport Area (LATA)—
The geographic area within which a local exchange carrier (LEC) provides service is typically divided into various areas referred to as local access transport areas (LATA's).

Local Exchange Carrier (LEC)—
A local exchange carrier (LEC) is a telephone service provider that provides telephone service to its customers in a specific geographical serving area. A local exchange carrier (LEC) would typically be a local telephone company.

Local Exchange Routing Guide (LERG)—
A document defining the specific local access transport area (LATA) within which a given telephone number is located.

Location Routing Number (LRN)—
A number obtained from the database at the service control point (SCP). The SCP converts the called number into the LRN which is the number used by the network to get the call to its final destination.

Loop—
Telephones are connected (from homes or businesses) via wires called "loops" to a switching office normally referred to as an end office or "eo".

Meet-Point Billing—
Traffic exchanged between interexchange carriers (IXC's) and independent local exchange carriers (ILEC's) destined for local exchange carrier (LEC) customers (in cases where the IXC does not directly interconnect with the LEC) is governed by tariffs and/or contracts, using a compensation mechanism referred to as meet-point billing. Under meet-point billing, IXC's pay the ILEC a fee, part of which is subsequently paid by the ILEC to the LEC for each Minute of Use (MOU) of traffic between the IXC and the LEC.

Minute of Use (MOU)—
For billing purposes a measure of the time which a given carrier's resources are consumed providing a given service.

Numbering Plan Address (NPA)—
More commonly known as the area code of the telephone number.

NPANXX—
The numbering plan address (i.e., the area code) plus the next three digits of the telephone number.

Originating Point Code (OPC)—
The Signaling System 7 (SS7) node [e.g. switching office or Signaling Transfer Point (STP)] that is sending the message.

Reciprocal Compensation—
Under reciprocal compensation, carriers pay each other a usage fee for each Minute of Use (MOU) of traffic delivered from their network to the other carrier's network. This message traffic is typically traffic exchanged between various local exchange carriers (LEC's) and their competitive local exchange carriers (CLEC's) and independent local exchange carriers (LEC's). This type of traffic is generally carried over a type of telephone trunk called a local trunk.

Release Complete Message (RLC)—
The Release Complete Message (RLC) is sent when the second of the two connected parties hangs up. At that point the trunk is released.

Release Message (REL)—
The Release Message (REL) indicates that the first of the two connected parties has hung up.

REL Timestamp—
The time the operator of the first telephone to hang up did so.

Remote Site Processors—
A device used to consolidate partial Call Detail Records (CDR's) into complete CDR's.

RLC Timestamp—
The time the operator of the second telephone to hang up did so.

Service Control Point (SCP)—
A network database used to translate called numbers into local routing number which translates the called number in the location routing number (LRN).

Signaling Transfer Points (STP's)—
At the heart of the SS7 network are packet switches known as Signaling Transfer Points (STP's). STP's are deployed in pairs in the North American SS7 network to provide communication path redundancy. Different carriers own a portion of the SS7 network and interconnect their end offices (eo's) and tandem's to the overall SS7 network so as to enable end-to-end communication between carriers.

SS7 Links—
The communication links over which Signaling System 7 (SS7) traffic is carried.

SS7 Network—
The Signaling System 7 (SS7) messages are transported over a secure data network referred to as the "SS7 network". The SS7 network comprises various SS7 Links along with Signaling Transfer Points (STP's).

SS7 Protocol—
To perform the task of call setup and tear down when multiple end offices (eo's) are involved, switching offices communicate with each other using a signaling protocol referred to as Signaling System 7 (SS7), carried over SS7 links. SS7 messages are used in specific sequences to perform various tasks required to establish telephone connections. Telephone calls between two customers connected to the same eo will be handled by the application logic contained in the eo, and will not require the use of the SS7 protocol.

Tandem—
In certain cases, for example two towns that are somewhat far apart, a type of switching center called a "tandem" is involved in establishing connectivity between two customers.

TCIC—
Trunk Circuit Identification Code. Between any two telephone switches there may a trunk group which comprises several trunks. These trunks are identified via the TCIC.

Transit Network Selection (TNS)—
Parameters contained within the Signaling System 7 (SS7) Initial Address Message (IAM) message which can be used to identify the requested interexchange carrier (IXC).

Transit Traffic—
Traffic that goes thru a LEC network but does not originate or terminate in that LEC and uses trunks other than those specifically designated for such traffic.

Trunk—
When telephones are served from different eo's (e.g. in different towns), they are interconnected via wires called "trunks" between the eo's.

Wide Area Network (WAN)—
A communication network serving a large geographical area of interest.

4. Discussion:

Previous methods for the determination of telephone traffic routing have been based upon a single call sample, e.g. a call record obtained at the point where the call originates or at the point where the call terminates. The information available within a single call record has limitations due to the fact that critical routing information may be (a) missing or (b) incorrect. These techniques have proven to be ineffective at determining the presence of arbitrage. Since in typical arbitrage situations, the local exchange carrier is under billing the interexchange carriers, there is a great financial incentive for the local exchange carrier to detect and stop arbitrage, and since previous methods are both unreliable and labor intensive, there is a great need for improved means for detecting arbitrage.

SUMMARY OF THE INVENTION

The present patent document discloses novel methods for the correlation of calling records and for the detection of mis-routing of traffic in a telephone or other communication system. Previous methods for detection of mis-routing have been based upon a single call sample, e.g. a call record obtained at the point where the call originates or at the point where the call terminates. The information available within a single call record has limitations due to the fact that critical routing information may be (a) missing or (b) incorrect, and these techniques have proven to be ineffective at determining the presence of arbitrage. Correlation of call detail records obtained from various communication segments provides the ability to mutually enrich the records so as to increase billing accuracy as well as to enhance the detection of call mis-routing.

Techniques disclosed in the present patent document can be used to identify inter-carrier telephone calls that are being mis-routed in such a way as to violate existing regulatory tariffs and/or established inter-carrier contracts The common name for this manipulation is "arbitrage", and the intent of the perpetrators is to take advantage of lower rates associated with the delivery of telephone traffic via routes other than those legislated or contracted. Through the process of correlation in representative embodiments, various call "legs" associated with the same call can be identified, and a more accurate "compound" call record can be made that incorporates call routing information obtained from the individual call legs.

In a representative embodiment, a basic approach to arbitrage detection is to correlate inbound calls from a competitive local exchange carrier (CLEC) to a local exchange carrier (LEC) with the corresponding outbound calls at their point of origin. Correlation can be obtained via a variety of data obtained from call detail records in the SS7 network.

The correlation feature of the link monitoring system (LMS) is the primary tool used to implement arbitrage detection. Call detail records (CDR's) are collected throughout the LEC footprint and "correlated" at the time of their load into the call detail record database. The correlation method comprises identifying call segments via call detail records wherein (1) the called station numbers are identical and (2) the time of call initiation and the time the first party hangs up match within a configurable, but very small, time difference. The correlation method typically applies different time thresholds depending upon whether the call segments being correlated are deemed to be adjacent (e g. on either side of a tandem), or non-adjacent (e.g more than two tandems away from each other).

In order to eliminate false correlations (i.e., to disassociate call segments that really are not related to the same call), attempts are made to increase the correlation confidence by correlating other pieces of call setup information from the various call segments. Specifically, further efforts can be made to (1) confirm that the time the connection for the call was completed matches within a configurable, but very small, time difference, (2) insuring that the calling number information parameters match, (3) insuring that charge number information parameters match, and/or (4) insuring that jurisdiction information parameters match.

Additional constraints can be applied to select calls that fit the criteria of arbitrage, and to exclude calls that may be correlated for other-legitimate reasons or duplicate call segments that may have been collected due to over-provisioning of the link monitoring systems.

A measure of the probability of arbitrage is based upon the combinations of characteristics that are present. Once suspected, SS7 call detail records are randomly chosen and compared with billing records to confirm arbitrage. Once arbitrage is confirmed, the characteristics of known arbitrators can be further refined. Traffic profiles of carriers can be created that contain historical traffic information. Arbitrage may be suspected whenever the traffic profiles of two or more carriers change in ways inversely proportional to each other, suggesting the redirection of traffic from one carrier to another. Once suspected, SS7 call detail records can be analyzed in further detail to confirm the arbitrage.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and:

FIG. 1A is a drawing of a telephone or similar communication system as described in various representative embodiments of the present patent document.

FIG. 1B is a drawing of the telephone or similar communication system in preparation for call connection as described in various representative embodiments of the present patent document.

FIG. 1C is a drawing of the telephone or similar communication system with call connection complete as described in various representative embodiments of the present patent document.

FIG. 1D is a drawing of the telephone or similar communication system with one party disconnected as described in various representative embodiments of the present patent document.

FIG. 1E is a drawing of the telephone or similar communication system immediately following last party disconnect as described in various representative embodiments of the present patent document.

FIG. 1F is a drawing of the telephone or similar communication system after trunk release as described in various representative embodiments of the present patent document.

FIG. 2A is another drawing of the messaging system of the telephone or similar communication system as described in various representative embodiments of the present patent document.

FIG. 2B is yet another drawing of the messaging system of the telephone or similar communication system as described in various representative embodiments of the present patent document.

FIG. 3A is a drawing of a representative example of call routing in the telephone or similar communication system without arbitrage as described in various representative embodiments of the present patent document.

FIG. 3B is a drawing of a representative example of call routing in the telephone or similar communication system with arbitrage as described in various representative embodiments of the present patent document.

DETAILED DESCRIPTION OF THE PREFERRED EMBODIMENTS

Figure 2C:
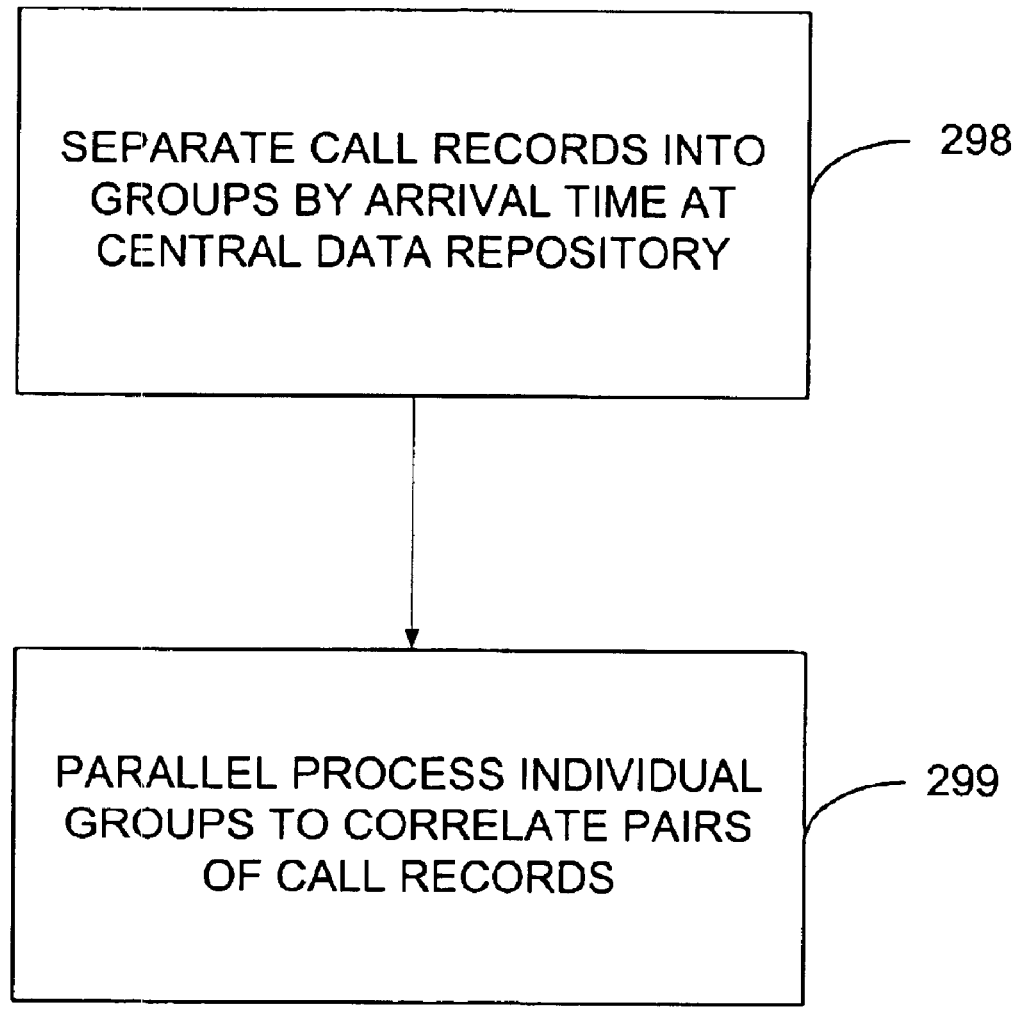
FIG. 2C is a flowchart for separation of call data records in the telephone or similar communication system as described in various representative embodiments of the present patent document.

As shown in the drawings for purposes of illustration, the present patent document discloses novel methods for the correlation of calling records and for the detection of mis-routing of traffic in a telephone or other communication system. Previous methods for detection of mis-routing have been based upon a single call sample, e.g. a call record obtained at the point where the call originates or at the point where the call terminates. The information available within a single call record has limitations due to the fact that critical routing information may be (a) missing or (b) incorrect, and these techniques have proven to be ineffective at determining the presence of arbitrage. Correlation of call detail records obtained from various communication segments provides the ability to mutually enrich the records so as to increase billing accuracy as well as to enhance the detection of call mis-routing. In the following detailed description and in the several figures of the drawings, like elements are identified with like reference numerals.

1. Introductory Comments:

Techniques disclosed in the present patent document can be used to identify inter-carrier telephone calls that are being mis-routed in such a way as to violate existing regulatory tariffs and/or established inter-carrier contracts The common name for this manipulation is "arbitrage", and the intent of the perpetrators is to take advantage of lower rates associated with the delivery of telephone traffic via other routes. Through the process of correlation in representative embodiments, various call "legs" associated with the same call can be identified, and a more accurate "compound" call record can be made that incorporates call routing information obtained from the individual call legs. Other techniques disclosed herein can be used to correlate call data records created in one part of the network with call detail records created in another part. Such techniques have application in calling traffic, detection of call mis-routing, and call billing.

2. The Telephone System Environment:

A local exchange carrier (LEC) operates in and serves individual telephone subscribers in a specific geographical serving area. The serving area is typically divided into Local Access Transport Areas (LATA's). The LEC interconnects to competitive local exchange carriers (CLEC's), Independent local exchange carriers (ILEC's) and Interexchange Carriers (IXC's) throughout its serving area.

Traffic exchanged between IXC's and LEC's/ILEC's/CLEC's is governed by tariffs and/or contracts, using a compensation mechanism referred to as access traffic. Under access traffic, IXC's pay the other carriers for each Minute of Use (MOU) of traffic destined to the IXC or originating from the IXC. This type of traffic is generally carried over a type of telephone trunk called a Feature Group D trunk or FG-D trunk, and typically carries the highest per-minute charge.

Traffic exchanged between CLEC's and LEC's and between ILEC's and LEC's is typically governed by tariffs and/or contracts, using a compensation mechanism referred to as reciprocal compensation. Under reciprocal compensation, carriers pay each other a usage fee for each Minute of Use (MOU) of traffic delivered from their network to the other carrier s network. This type of traffic is generally carried over a type of telephone trunk called a local trunk.

Traffic exchanged between IXC's and ILEC's destined to LEC customers (in cases where the IXC does not directly interconnect with the LEC) is governed by tariffs and/or contracts, using a compensation mechanism referred to as meet-point billing. Under meet-point billing, IXC's pay the ILEC a fee, part of which is subsequently paid by the ILEC to the LEC for each Minute of Use (MOU) of traffic between the IXC and the LEC.

3. Overview of Telephony, SS7, and Call Detail Records:

3.1 Basic Telephony:

Telephones are connected (from homes or businesses) via wires called "loops" to a switching office normally referred to as an end office or "eo". Telephone calls between two customers served by the same eo is handled by the application logic contained in the eo and will not require the use of the SS7 protocol described in the following.

When telephones are served from different eo's (e.g. in different towns), they must be interconnected via wires called "trunks" between the eo's. This type of telephone call will require inter-office coordination, usually via a networking protocol called SS7.

In certain cases, for example two towns that are somewhat far apart, another type of switching center called a "tandem" is also involved in establishing connectivity between two customers.

To satisfy various regulatory requirements, telephone carriers are classified as either "exchange carriers" (e.g., CLEC's) or "interexchange carriers" (e.g. IXC's). Calls that span Local Area Transport Areas must use an interexchange carrier.

To perform the task of call setup and tear down (when multiple eo's are involved), switching offices communicate with each other using a signaling protocol referred to as Signaling System 7 (SS7), carried over SS7 links. SS7 messages are used in specific sequences to perform various tasks required to establish telephone connections. The SS7 messages are transported over a secure data network separate from the telephone call connection and referred to as the "SS7 network". At the heart of the SS7 network are packet switches known as Signaling Transfer Points (STP's). STP's are deployed in pairs in the North American SS7 network to provide communication path redundancy. Different carriers own a portion of the SS7 network, and interconnect their eo's and tandem's to the overall SS7 network to enable end-to-end communication between carriers SS7 messages consist of a message type and associated parameters. In a representative embodiment, FIGS. 1A–1F below illustrate the use of SS7 in the basic setup and tear down of telephone calls. For clarity of illustration, the configuration described in FIGS. 1A–1F only comprises two eo's. The example is intended for illustrative purposes only. Other switching points and communication lines could be involved in any given connection between two stations.

FIG. 1A is a drawing of a telephone or similar communication system 100 as described in various representative embodiments of the present patent document. FIG. 1B is a drawing of the telephone or similar communication system 100 in preparation for call connection as described in various representative embodiments of the present patent document. FIG. 1C is a drawing of the telephone or similar communication system 100 with call connection complete as described in various representative embodiments of the present patent document. FIG. 1D is a drawing of the telephone or similar communication system 100 with one party disconnected as described in various representative embodiments of the present patent document. FIG. 1E is a drawing of the telephone or similar communication system 100 immediately following last party disconnect as described in various representative embodiments of the present patent document. FIG. 1F is a drawing of the telephone or similar communication system 100 after trunk release as described in various representative embodiments of the present patent document.

In FIG. 1A a first station 105, also referred to herein as a calling station 105 and as a calling telephone 105, is connected via a first loop 110 to a first switching office 115, also referred to herein as a first end office 115 and as a first eo 115. A second station 106, also referred to herein as a called station 106 and as a called telephone 106, is connected via a second loop 111 to a second switching office 116, also referred to herein as a second end office 116 and as a second eo 116. First and second switching offices 115,116 are connected to each other via a number of trunks 120. Two redundant signaling systems 130, comprise signal links 135, and transfer points 140. In modern telephone systems, signaling systems 130 are Signaling System 7 (SS7) networks 130, signal links 135 are SS7 links 135, and transfer points are signaling transfer points (STP's) 140. For clarity, identifying numeral 130 is not shown in the FIG. 1A but is understood to comprise the aforementioned elements. As previously mentioned, one or both of the signaling systems 130 is used for the passing of messages necessary to complete a connection between the calling station 105 and the called station 106.

In FIGS. 1B–1F, one of the redundant signaling systems 130 has been removed as an to aid in clarity of illustration.

In FIG. 1B, a first message 150, which in the SS7 system 130 is referred to as an initial address message (IAM) 150 and also herein as a call initiation signal 150, is sent from the first switching office 115 via signal links 135 and transfer point 140 of signaling system 130 to the second switching office 116 to indicate the desire to set up a call. Trunk 120 is then seized by the first switching office 115 and "reserved" for use in the call. Connection between calling station 105 and first switching office 115 (i.e., first loop 110), as well as the trunk 120 seized to connect first and second switching offices 115,116 is indicated in FIG. 1B by bold lines. A second message 155, which in the SS7 system 130 is referred to as address complete message (ACM) 155, is sent from the second switching office 116 via signal links 135 and transfer point 140 of signaling system 130 to acknowledge receipt of the IAM 150 and to indicate that the called station 106 is being alerted (e.g., via ringing).

In FIG. 1C, a third message 160, which in the SS7 system 130 is referred to as an answer message (ANM) 160, is sent from the second switching office 116 via signal links 135 and transfer point 140 of signaling system 130 to the first switching office 115 to indicate when the called station 106 has answered. End to end connection is then established, and a conversation can take place. Connection between calling station 105 and first switching office 115 (i.e., first loop 110), between first and second switching offices 115,116 via the trunk 120, and between second switching office 116 (i.e., second loop 111) and called station 106 is indicated in FIG. 1C by bold lines.

In FIG. 1D, a fourth message 165, which in the SS7 system 130 is referred to as a release message (REL) 165, is sent from one of the switching offices, in this example the first switching office 115 via signal links 135 and transfer point 140 of signaling system 130 to the second switching office 116 to indicate that one of the parties, in this example calling station 105, has disconnected from the established communication link. In other words, the calling station 105 hung up. Connection between first and second switching offices 115,116 via the trunk 120 and between second switching office 116 (i.e., second loop 111) and called station 106 is indicated in FIG. 1D by bold lines.

In FIG. 1E, a fifth message 170, which in the SS7 system 130 is referred to as a release complete message (RLC) 170, is sent from one of the switching offices, in this example the second switching office 116 via signal links 135 and transfer point 140 of signaling system 130 to the first switching office 115 to indicate that one of the parties, in this example called station 106, has disconnected from the established communication link. Again in other words, the called station 106 hung up. Connection between first and second switching offices 115,116 via the trunk 120 is indicated in FIG. 1E by bold lines. At that point the trunk 120 is released as indicated in FIG. 1F.

3.2 SS7 Messages:

Signaling transfer points 140 in the SS7 network 130 transport the SS7 messages along with various parameters used though-out the call set up process to not only produce the desired connections, but also to enable all the switching offices involved to obtain measurements that can later be used to accurately bill the customers involved. Table 1 identifies key parameters comprising call detail records T100. Call detail records T100 are also referred to herein as CDR's T100, data records T100 and as records T100. Of particular interest in Table 1 are (1) the calling number T110 of the user (station) making the call, (2) the charge number T120 of the user (station) making the call, (3) the SS7 node that is sending the message T130, also referred to herein as jurisdiction information parameter T130, (4) a forward interworking parameter T140, (5) the backward interworking parameter T150, (6) the SS7 node that the message is being sent to T160, also referred to herein as carrier identification code T160, and (7) the number dialed by the user T170.

Certain timestamps associated with the dates and times at which each SS7 message is detected are also recorded as shown in Table 2. Of particular interest in Table 2 are (1) an initial address massage (IAM) timestamp T210, also referred to herein as first timestamp T210, (2) a release message (REL) timestamp T220, also referred to herein as second timestamp T220, and (3) an answer message (ANM) timestamp T230, also referred to herein as third timestamp T230.

3.3 Call Detail Records (CDR's):

The parameters and time-stamps associated with each message or collection of information referred to as the call detail record T100, as shown in Tables 1 and 2, are the primary pieces of information needed to determine who called whom, how the call was routed and what the call disposition was.

For the illustrative purposes of this description, we will ignore other parameters that are used to handle more complex telephony services such as: Operator assisted calls, forwarded calls, 800 service, Local Number Portability, etc.

The following discussion describes the functionality and mechanisms relating to the matching of records T100 relating to the same underlying telephone call. This matching of records T100 has applications in traffic routing analysis, interconnection billing, and the detection of mis-routed traffic or arbitrage. For example, in call routing analysis the records T100 can be used to identify the path of calls through a network 100. It can be used to relate a call flowing between multiple networks, e.g. leaving a local network flowing through an external network and reappearing at the same or another local network. For call routing efficiency, as well as billing purposes and arbitrage detection, it is important to identify the route that the call followed.

3.3.1 Call Detail Record Correlation Techniques:

In a representative embodiment, call detail records (CDR's) T100 are specified as being correlated based upon criteria comprising the following elements: (1) a combination of time differences between potentially related events observed at different points in the network which can differentiate between alternate paths through the network (e.g., single tandem, multiple tandem, internetwork call), (2) partial and full addressing parameter matching (such as a called telephone number T170), (3) identification of calls traversing a single switch by a common point code in the destination and originating point codes T160,T130 of two records T100, and (4) use of additional fields to increase confidence of record matching (e.g. using calling and charging number matching). From the above items a correlation confidence is obtained which can be used to indicate the degree of similarity of call leg records T100 which could be used, for example, to overcome the masking techniques employed to bypass access charges such as masking part of all of the calling and/or charge party identifiers T110,T120 or though the introduction of a new/altered partial or full calling and/or charge identities.

3.3.2 Duplicate Call Detail Records:

Duplicate records T100 are defined to be two or more call records T100 relating to the same call leg between any two directly connected network element nodes. These are detected based on the presence of matching point code (originating T130 and destination T160) and identical trunk circuit identifiers in addition to the event timestamps closely matching.

3.33 Data Enrichment of Call Detail Records:

Using related call records T100, fields can be copied forward to earlier related records T100 to indicate information added as the call traversed a network 100—e.g. to indicate to earlier related call records T100 the ultimate destination of a call. Or can be used to compensate for data that has been inadvertently or intentionally lost/masked in later related call records T100 by copying that masked data from earlier related call records T100. Specifically, (1) the calling number T110 can be copied into later related call leg records T100 to indicate the true origination of a call. This can be employed for improved billing accuracy and detection of access charge bypass (arbitrage) and (2) the local routing number (LNP) of a "dumped" or pre-translated ported call can be copied back to earlier call legs of the same call which may have been prior to the LNP query/translation, this enables the ultimate destination to be available to earlier records.

FIG. 2A is another drawing of the messaging system of the telephone or similar communication system 100 as described in various representative embodiments of the present patent document. In the representative embodiment of FIG. 2A, a first signaling path segment 261 is connected to a first signaling transfer point 271 indicated in FIG. 2A as S1; the first signaling transfer point 271 is connected to a second signaling path segment 262; the second signaling path segment 262 is connected to a second signaling transfer point 272 indicated in FIG. 2A as S2; the second signaling transfer point 272 is connected to a third signaling path segment 263; the third signaling path segment 263 is connected to a third signaling transfer point 273 indicated in FIG. 2A as S3; and the third signaling transfer point 273 is connected to a fourth signaling path segment 264. In the SS7 network 130, the signaling path segments 261,262,263,264 are used to transport messages or signals required by the telephone system 100 to connect the calling station 105 to the called station 106, thereby completing the call and permitting communication between calling station 105 and called station 106, as well as to subsequently disconnect the call. Signaling transfer points 271,272,273 route the call messages to the appropriate signaling path segments 261, 262,263,264. Copies of the call records T100 created during call creation are sent to a central data repository 215 as shown in FIG. 2D and as will be discussed with that figure. In the example of FIG. 2A, a first call data record 281 is created at a first call record creation point 291, and a second call data record 282 is created at a second call data creation point 292.

FIG. 2B is yet another drawing of the messaging system of the telephone or similar communication system as described in various representative embodiments of the present patent document. In addition to the elements shown in FIG. 2A, FIG. 2B shows calling station 105 connected to an initial signaling path segment 260 which is connected to an initial signaling transfer point 270 and which is connected in turn to the first signaling path segment 261. Also shown is called station 106 connected to a fifth signaling path segment 265 which is connected to a fourth signaling transfer point 274 which is connected in turn to the fourth signaling path segment 264. Also as shown in FIG. 2B, a third call data record 283 is created at a third call data creation point 293.

Further, in FIG. 2B the location routing number 297 corresponding to the called number T170 is obtained from a network element database 295 also referred to as a service control point database 295.

Figure 2D:
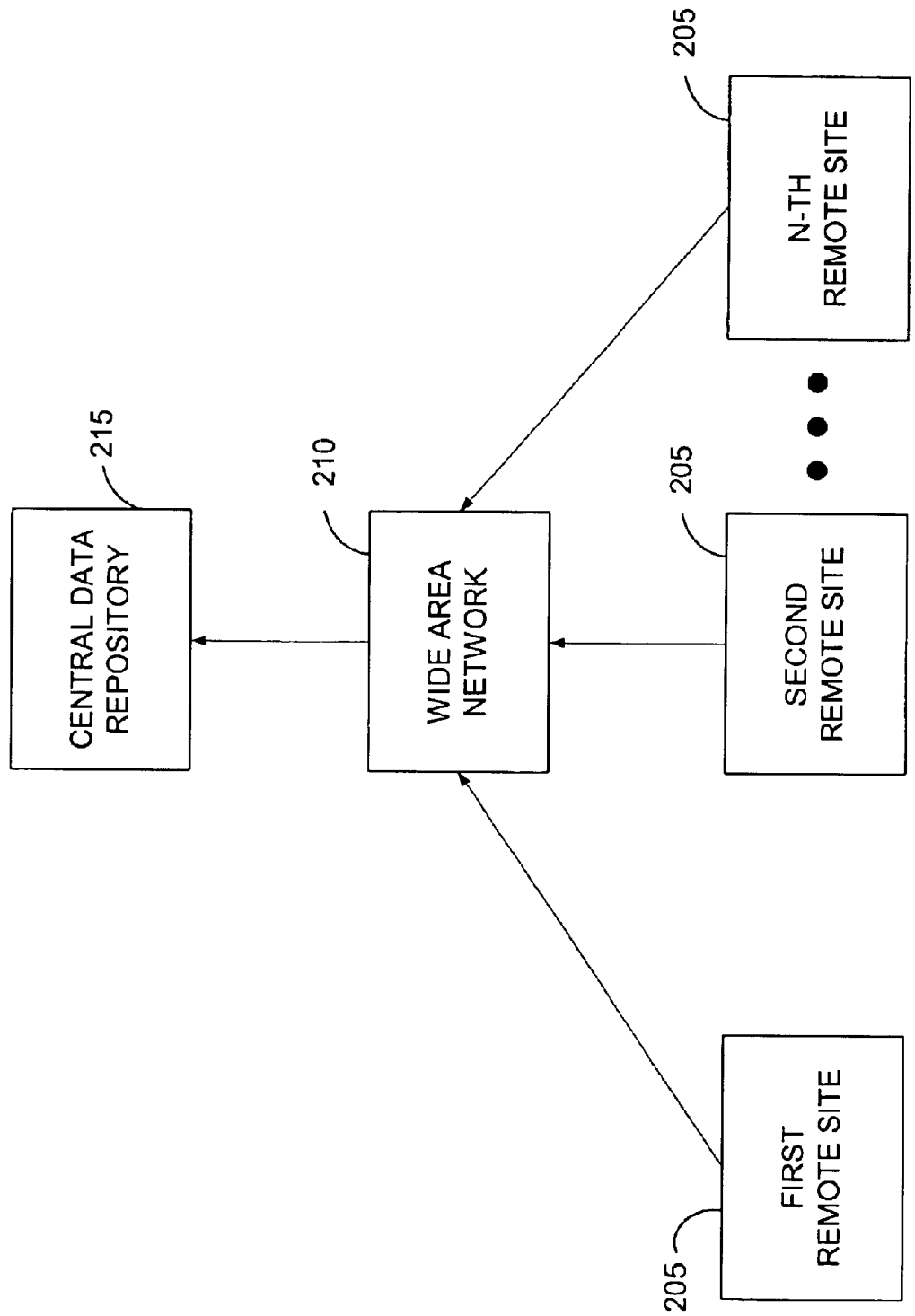
FIG. 2D is a drawing of a system for accumulating call detail records into a central data repository.

FIG. 2C is a flowchart for separation of call data records T100 in the telephone or similar communication system 100 as described in various representative embodiments of the present patent document. In block 298, the call data records T100 are separated in time order by arrival time at the central data repository 215 of FIG. 2D. Block 298 then transfers control to block 299.

In block 299 the separated groups of call data records T100 are sent to different processing units wherein parallel processing correlates the call data records T100. Parallel processing enables more rapid correlation.

3.3.4 Efficiency of Correlation:

A critical factor in the performance of a correlating call detail records T100 is the reduction of the number of comparisons required to locate a candidate matching record T100 and then establish the confidence of matching. In a representative embodiment, since call records T100 arrive in approximately call release time at a central data base that is used to collect the system call detail records T100, they are ordered in time. Thus, they require minimal sorting to result in a fully ordered record sequence in call release time order. Sets of call detail records T100 can be grouped by time periods to enable parallel processing on a symmetric multiprocessing server.

In another representative embodiment, call detail records T100 are separated into data streams according to the value of at least one digit in the called number T170. Typically the selected digit or digits are those rightmost in the number. As an example, if two digits are selected as the separation criteria, call data records for called number T170 312-465-6789 are separated first into the data stream identified by "89" in the called number T170. Note that in this example as many as 100 separate data streams could be created with resultant reduction in record T100 comparison time. The number of separations could also be selected to be less than 100 in this example.

3.3.5 Correlation Summary:

In the SS7 network 130, signaling path segments 260, 261,262,263,264,265 transport SS7 messages through signaling path segments 260,261,262,263,264 along with various parameters used though-out the call set up process to not only produce the desired connections, but also to enable all the switching offices involved to obtain measurements that can later be used to accurately bill the customers involved.

3.3.6 Arbitrage Summary:

The arbitrage detection methods as disclosed in representative embodiments comprise two techniques: (1) correlation and (2) statistical analysis. In the correlation process, call detail records T100 collected at the final leg of the call are correlated with call detail records T100 collected on earlier legs of the call, of which there may be numerous legs. Arbitrage is detected whenever a call initially directed to an interexchange carrier is later found to be delivered to the local exchange carrier via a means inconsistent with the delivery of interexchange traffic. In the statistical process, call detail records T100 between two carriers are collected and analyzed to characterize the traffic with respect to certain key parameters. Arbitrage is suspected when the characteristics match predefined patterns.

Call detail records T100 can be collected using a variety of methods, including the use of a Link Monitoring System (LMS), such as Agilent Technologies' acceSS7 system, although the basic elements of the present invention do not rely on a specific collection technique or specific vendor equipment. Link monitoring systems are designed to capture the SS7 call detail records T100 as described in Table 1. Measurement equipment is deployed at each of the signal transfer point 140 locations, and "listens" to the SS7 messages being transported over the SS7 links 135.

FIG. 2D is a drawing of a system for accumulating call detail records T100 into a central data repository 215, also referred to herein as a call detail record data base 215. Link monitoring systems detect the SS7 messages, timestamp them, and associate them into partial call detail records T100. At remote sites 205 processors consolidate partial call detail records T100 into complete call detail records T100, and forward the completed call detail records T100 in near real-time via a wide area network (WAN) 210 to a central data repository 215, which could be for example a database that stores the call detail records T100. The call detail record database 215 is typically designed to store large quantities of call detail records T100 for extended periods of time.

The quantity and breadth of information stored is dependent on the extent to which the link monitoring system (LMS) has been deployed on the carrier's network. In typical embodiments, it is sufficient to monitor all the SS7 links that provide interconnection between the local exchange carrier and other types of carriers, although additional coverage will provide more information that can be used to strengthen results of the analysis.

Figure 2E:
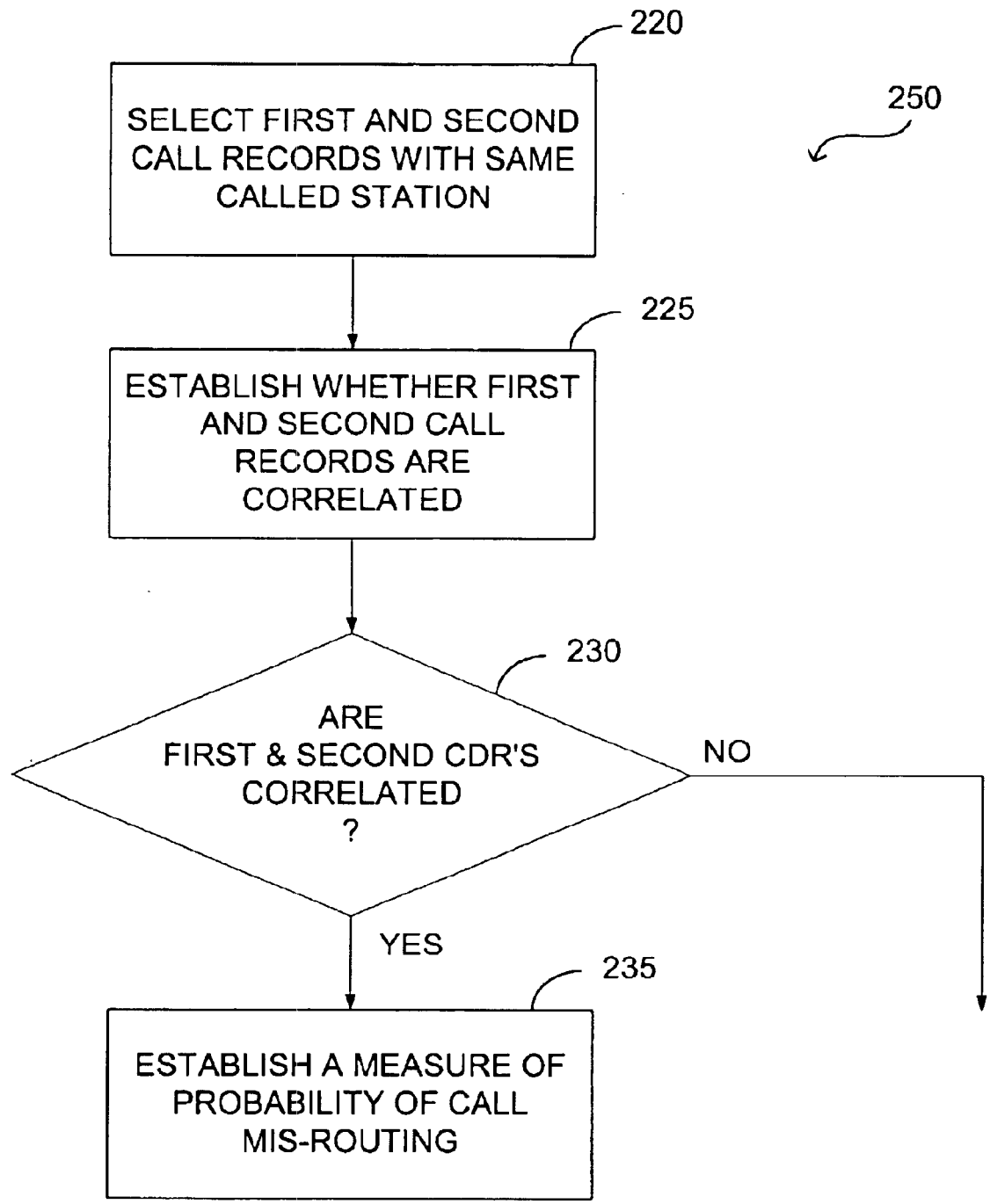
FIG. 2E is a flow chart of a representative method for detection of arbitrage in the telephone or similar communication system as described in various representative embodiments of the present patent document.

4. Overview of Arbitrage Detection:

FIG. 2E is a flow chart of a representative method 250 for detection of arbitrage in the telephone or similar communication system 100 as described in various representative embodiments of the present patent document. In Block 220 of FIG. 2E, a first and second call records T100 are selected, wherein the first and second call records T100 both have the same called station 106. Block 220 then transfers control to block 225.

Block 225 establishes whether the first and second call records T100 are correlated. Block 225 then transfers control to block 230.

When first and second call records T100 are correlated, block 230 transfers control to block 235.

Block 235 establishes a measure of the probability of call mis-routing.

5. Arbitrage Example:

FIG. 3A is a drawing of a representative example of call routing in the telephone or similar communication system 100 without arbitrage as described in various representative embodiments of the present patent document. In the representative example of FIG. 3A, a call originates from the calling station 105 located in a first local access transport area (LATA 1) 305, also referred to herein as a first remote area 305, to the called station 106 located in a second local access transport area (LATA 2)306, also referred to herein as a second remote area 306. One call detail record T100 will be captured by a link monitoring system 310 for each leg of the call, assuming the link monitoring system 310 equipment is monitoring the appropriate SS7 links. In this example of a call originating in one part of the LEC network (LATA 1 305) and ending in another part of the network (LATA 2 306) could result in as many as 4 monitored call detail record's as follows:

1. LEC eo 321 to LEC Tandem 322 in LATA 1 305
 2. LEC Tandem 322 in LATA 1 305 to IXC Tandem 323 in IXC network 307
 3. IXC Tandem 323 in IXC network 307 to LEC Tandem 324 in LATA 2 306
 4. LEC Tandem 324 to LEC Eo 325 in LATA 2 306.

Note that the call is not monitored as it traverses the IXC network 307, because the IXC SS7 links are not part of the LEC network. In FIG. 3A, LEC tdm 322 means LEC tandem 322, and LEC tdm 324 means LEC tandem 324.

FIG. 3B is a drawing of a representative example of call routing in the telephone or similar communication system 100 with arbitrage as described in various representative embodiments of the present patent document. In the representative example of FIG. 3B, an arbitrage call is delivered at its destination via a competitive local exchange carrier (CLEC) 330, instead of being delivered via a local exchange carrier (LEC) tandem 324 in LATA2 306, as illustrated in FIG. 3A.

The last leg of the call above, from the CLEC 330 to the LEC eo 325 in LATA 2 306, could appear to be a simple originating call from a CLEC customer to a LEC customer. However, by matching this leg with one of the originating call legs (LEC eo 321 to LEC tandem 322 or LEC tandem 322 to interexchange carrier 323) in the LATA 1 305 area, it is possible to demonstrate that the final leg is really the continuation of an earlier call.

Often the information needed to correlate the final call leg to prior call legs is missing or has been altered at some point. In representative embodiments, techniques are disclosed herein to effect recovery of sufficient information to allow the final call leg to be positively correlated with an earlier call leg, proving that the final call leg represents an improper routing of the original call.

6. Representative Methods for Detection of Arbitrage:

In a representative embodiment, a basic approach to arbitrage detection is to correlate inbound calls from a competitive local exchange carrier (CLEC) to a local exchange carrier (LEC) with the corresponding outbound calls at their point of origin.

The correlation feature of the link monitoring system (LMS) is the primary tool used to implement arbitrage detection. Call detail records (CDR's) T100 are collected throughout the LEC footprint and "correlated" at the time of their load into the call detail record database 215. The correlation method comprises identifying call segments via call detail records T100 wherein (1) the numbers dialed by the user (i.e., the called station numbers) T170 are identical and (2) initial address message (IAM) 150 timestamps T210 and release message (REL) 165 timestamps T220 match within a configurable, but very small, time difference. The correlation method typically applies different time thresholds depending upon whether the call segments being correlated are deemed to be adjacent (e g. on either side of a tandem), or non-adjacent (e.g more than two tandems away from each other).

Figure 4:
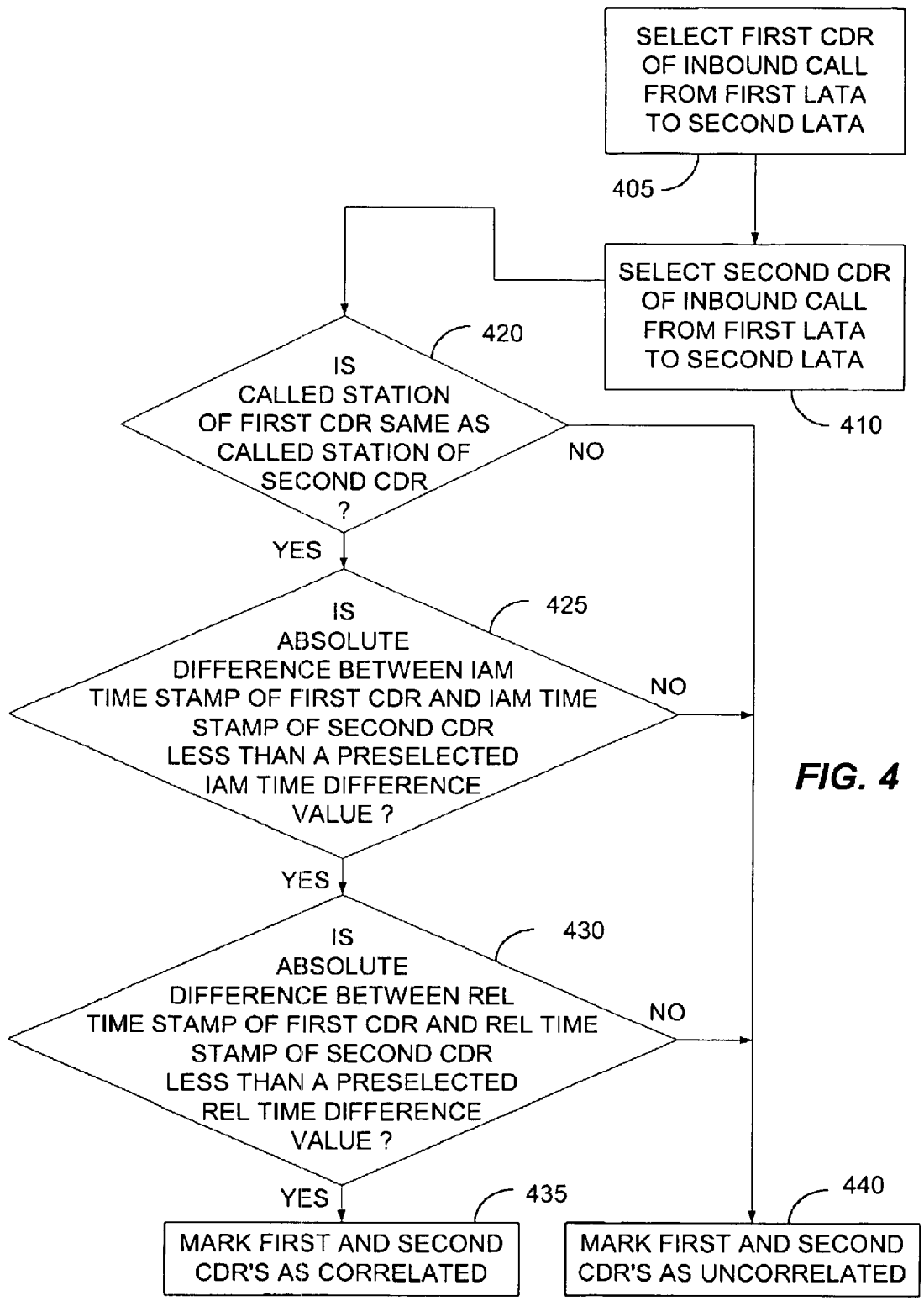
FIG. 4 is a flow chart of a method for correlating call detail records as described in various representative embodiments of the present patent document.

FIG. 4 is a flow chart of a method for correlating call detail records T100 as described in various representative embodiments of the present patent document. In block 405 a first call detail record 406, not shown in the figures but of form similar to that of Table 1 with time stamps of Table 2, of an inbound call from a first local access transport area 305 to a second local access transport area 306 is selected. Block 405 then transfers control to block 410.

In block 410 a second call detail record 407, not shown in the figures but of form similar to that of Table 1 with time stamps of Table 2, of an inbound call from a first local access transport area 305 to a second local access transport area 306 is selected. Block 410 then transfers control to block 420.

When the called station 106 of the first call detail record 406 is the same as the called station 106 of the second detail record 407, block 420 transfers control to block 425. Otherwise, block 420 transfers control to block 440.

When the absolute difference between the time stamp of the IAM of the first call detail record 406 subtracted from the time stamp of the IAM of the second call detail record 407 is less than a preselected initial address message (IAM) time difference 411, not shown in any of the figures and also referred to herein as a first time difference 411, block 425 transfers control to block 430. Otherwise, block 425 transfers control to block 440.

When the absolute difference between the time stamp of the REL of the first call detail record 406 subtracted from the time stamp of the REL of the second call detail record 407 is less than a preselected release message (REL) time difference 412, not shown in any of the figures and also referred to herein as a second time difference 412, block 430 transfers control to block 435. Otherwise, block 435 transfers control to block 440.

Block 435 marks the first and second call detail records 406,407 as correlated. The method above is typically repeated for other combinations of call detail records 406, 407.

Block 440 marks the first and second call detail records 406,407 as uncorrelated. Once again, the method above is typically repeated for other combinations of call detail records 406,407.

Call detail records 406,407 are typically checked against the above method as they are loaded into the central data repository 215 and are assigned the same correlation identification code if they are correlated. Note that it is possible for more than two call detail records to be correlated and assigned a single correlation identification code.

In order to eliminate false correlations (i.e., to disassociate call segments that really are not related to the same call), attempts are made to increase the correlation confidence by correlating other pieces of call setup information from the various call segments. Specifically, further efforts can be made to (1) identify ANM message time stamps that match within a configurable, but very small, time difference, (2) insuring that the Calling Number information parameters match, (3) insuring that Charge Number information parameters match, and/or (4) insuring that jurisdiction information parameters match.

Figure 5:
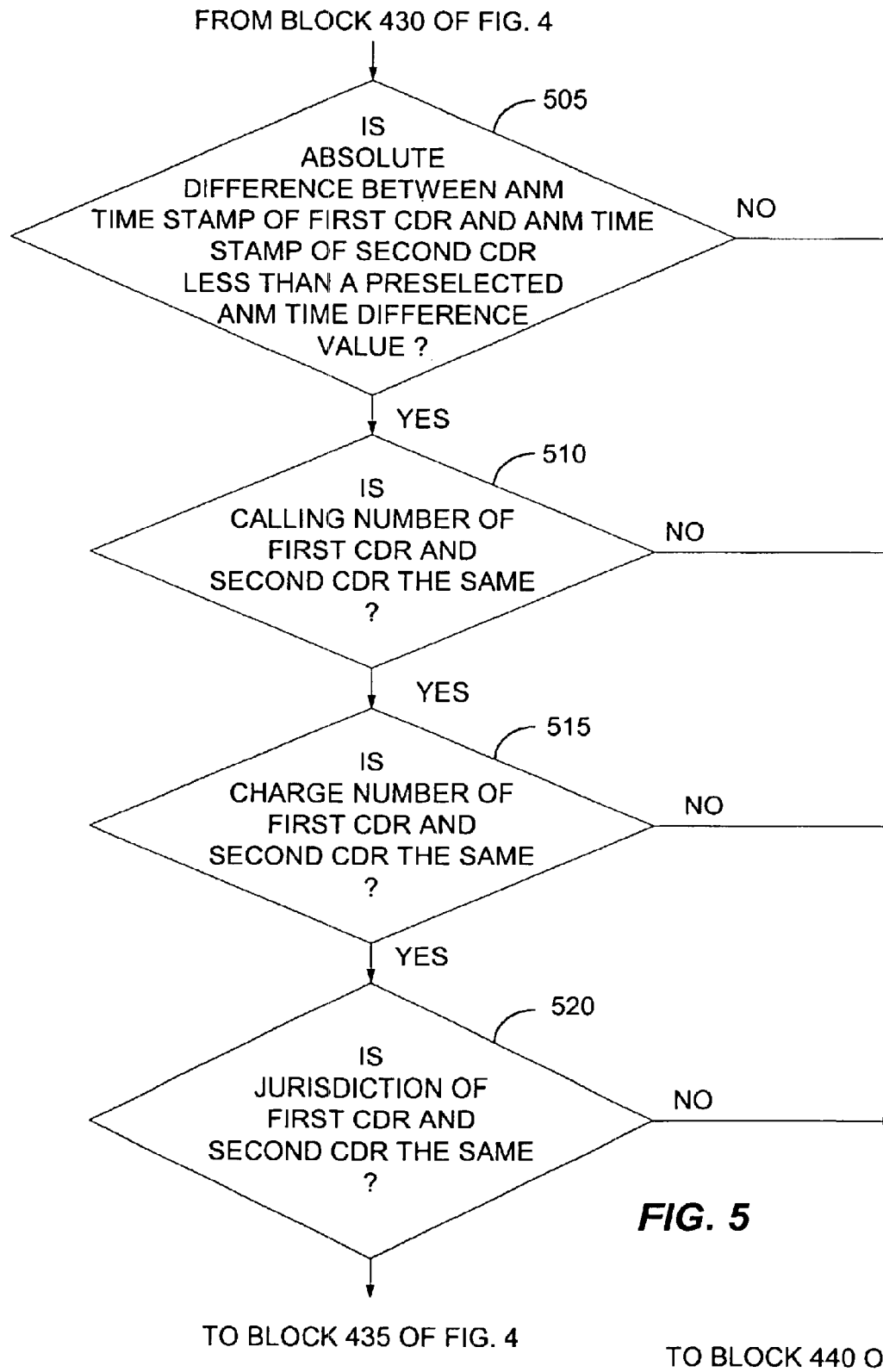
FIG. 5 is a flow chart of additional method steps for correlating call detail records as described in various representative embodiments of the present patent document.

FIG. 5 is a flow chart of additional method steps for correlating call detail records as described in various representative embodiments of the present patent document. The method steps of FIG. 5 are inserted between blocks 430 and 435 of FIG. 4. When the absolute difference between the time stamp of the ANM of the first call detail record 406 subtracted from the time stamp of the ANM of the second call detail record 407 is less than a preselected ANM time difference 413, not shown in any of the figures and also referred to herein as a third time difference 413, block 505 transfers control to block 510. Otherwise, block 505 transfers control to block 440.

When the calling number T110 of the first call detail record 406 is the same as the calling number T110 of the second call detail record 407, block 510 transfers control to block 515. Otherwise, block 505 transfers control to block 440.

When the charge number of the first call detail record 406 is the same as the charge number of the second call detail record 407, block 515 transfers control to block 520. Otherwise, block 515 transfers control to block 440.

When the jurisdiction of the first call detail record 406 is the same as the jurisdiction of the second call detail record 407, block 520 transfers control to block 435. Otherwise, block 520 transfers control to block 440.

Additional constraints can be applied to select calls that fit the criteria of arbitrage, and to exclude calls that may be correlated for other legitimate reasons or duplicate call segments that may have been collected due to over-provisioning of the link monitoring systems 310. Specifically, the following calls typically may be excluded: Calls inbound to the LEC network (non-transit, destined to a LEC telephone number) from CLEC's in a given LATA that correlate with outbound calls to IXC's in a different LATA. The following calls are also typically excluded: (1) non-toll calls and special types of calls such as those that require a two step dialing process to complete, (2) duplicate call segments (same opc/dpc/tcic/iam, same call detail records, etc.), (3) local number portability calls which could represent legitimate routing with IXC delivering call to original CLEC number, and CLEC performing lookup and completing call to LEC, and (4) call forwarding calls where call forwarding takes place at the CLEC, and the resulting call to the LEC appears to have originated in another LATA.

Several methods can be used to (a) jurisdictionalize call segments within LATA boundaries and to (b) identify outbound IXC calls and (c) identify non-transit inbound CLEC calls.

Jurisdictionalization can be performed by (1) Using a look-up table based on the Local Exchange Routing Guide (LERG) to map the calling or called NPANXX to a specific State/LATA, (2) If the NPANXX is missing, assign a default NPANXX based on the point code of the switching system involved in the call, and then use a look up table based on the local exchange routing guide (LERG) to map the calling or called NPANXX to a specific state and/or LATA, and (3) reading the geographic identification contained within each call detail record T100 that identifies the point in the network where the call detail record T100 was collected, and use a look-up table to map this geographic location to a specific state and/or LATA.

Identification of Outbound LEC to IXC Calls can be performed by (1) using a look-up table to map the specific trunk used on an originating LEC call derived from another look-Up table mapping the triplet of OPC, DPC and TCIC, which are available within the SS7 IAM message to a list of IXC trunks, (2) using the Transit Network Selection (TNS) or Carrier Identification Code (CIC) parameters contained within the SS7 IAM message to identify the requested IXC, and (3) using the destination point code (DPC) from the SS7 IAM message to identify calls routed to IXC's.

Identification of Non-transit Inbound from CLEC to LEC calls can be performed by (1) using a look-up table to map the specific trunk used on a terminating LEC call (derived from another look-up table mapping the triplet of OPC, DPC and TCIC, which are available within the SS7 IAM message) to a list of CLEC and (2) using the origination point code (OPC) from the SS7 IAM message to identify calls originating from CLEC's.

7. Statistical Analysis Methods:

In representative embodiments, there are two typical approaches to arbitrage detection using statistical analysis: (1) single-carrier and (2) multi-carrier.

7. Single Carrier:

The basic approach to arbitrage detection using this statistical analysis method is to characterize the traffic between two carriers based upon the following criteria and compare the results to the following characteristics which are often present in known arbitrators: (1) Percentage of calls where forward or backward interworking bit T140, T150 is set which implies that the call traversed a non-SS7 network, (2) percentage of calls wherein calling party information is available, (3) percentage of calls terminating to the ILEC, (4) percentage of calls where jurisdiction indicator parameter is available, (5) percentage of calls where carrier identification code is available, and (6) number of NPA's associated with the Calling Party Information.

Figure 6:
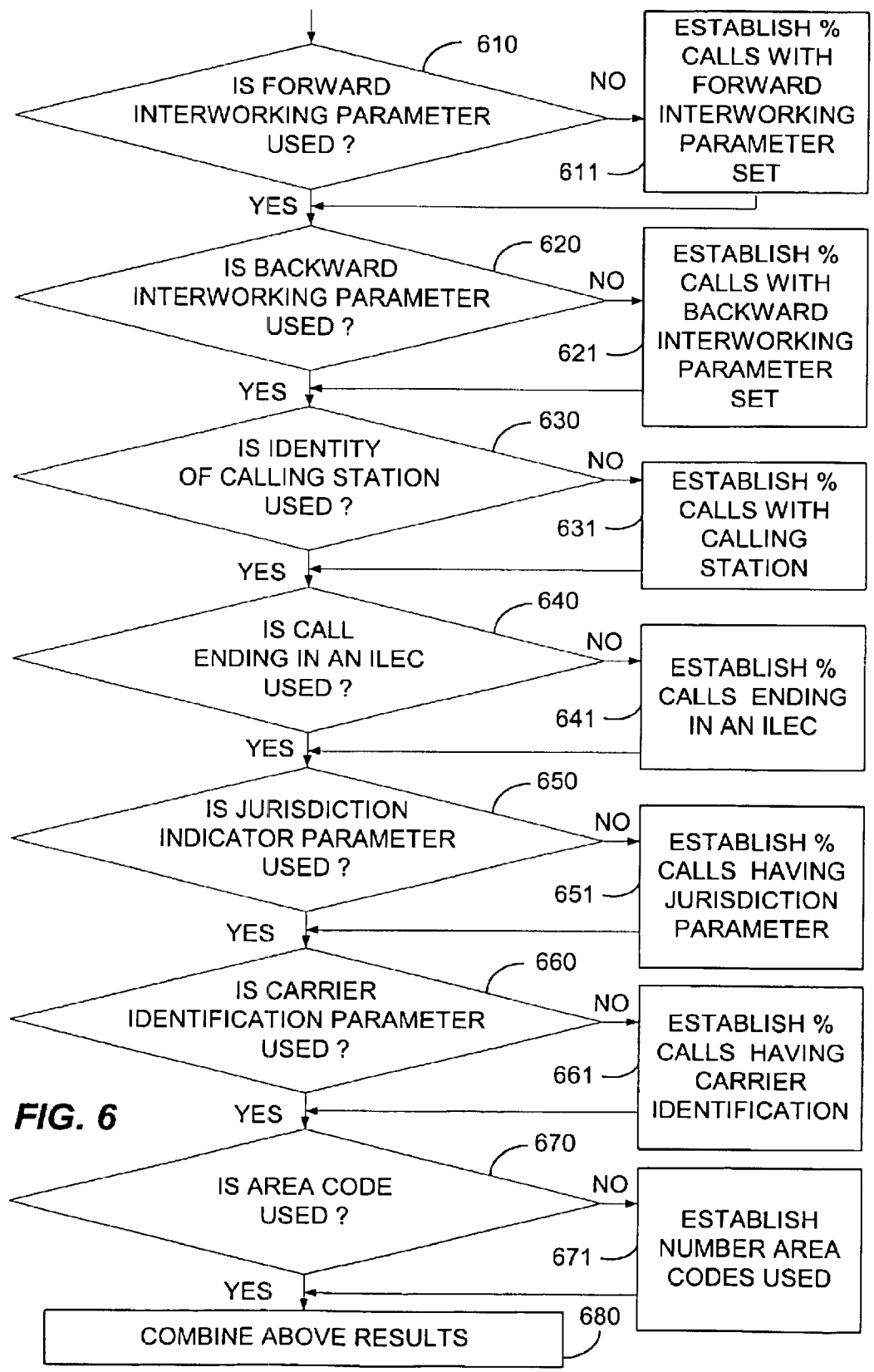
FIG. 6 is a flow chart of a method for establishing a probability of arbitrage in the telephone or similar communication system as described in various representative embodiments of the present patent document.

FIG. 6 is a flow chart of a method for establishing a probability of arbitrage in the telephone or similar communication system 100 as described in various representative embodiments of the present patent document. When the forward interworking parameter T140 is used to establish a measure of the probability of call mis-routing, block 610 transfers control to block 611. Otherwise block 610 transfers control to block 620.

In block 611, the percentage of calls wherein the forward interworking parameter T140 is set is established. Block 611 then transfers control to block 620.

When the backward interworking parameter T150 is used to establish a measure of the probability of call mis-routing, block 620 transfers control to block 621. Otherwise block 620 transfers control to block 630.

In block 621, the percentage of calls wherein the backward inter-working parameter T150 is set is established. Block 621 then transfers control to block 630.

When calling station information T110 availability is used to establish a measure of the probability of call mis-routing, block 630 transfers control to block 631. Otherwise block 630 transfers control to block 640.

In block 631, the percentage of calls wherein availability of calling station information T110 is established. Block 631 then transfers control to block 640.

When call ending in an ILEC 330 is used to establish a measure of the probability of call mis-routing, block 640 transfers control to block 641. Otherwise block 640 transfers control to block 650.

In block 641, the percentage of calls terminating in an independent local exchange carrier (ILEC) 330 is established. Block 641 then transfers control to block 650.

When jurisdiction indicator parameter information T130 availability is used to establish a measure of the probability of call mis-routing, block 650 transfers control to block 651. Otherwise block 650 transfers control to block 660.

In block 651, the percentage of calls wherein availability of jurisdiction indicator parameter information T130 is established. Block 651 then transfers control to block 660.

When carrier identification parameter T160 availability is used to establish a measure of the probability of call mis-routing, block 660 transfers control to block 661. Otherwise block 660 transfers control to block 670.

In block 661, the percentage of calls wherein availability of carrier identification parameter T160 is established. Block 661 then transfers control to block 670.

When calling station area code T100 is used to establish a measure of the probability of call mis-routing, block 670 transfers control to block 671. Otherwise block 670 transfers control to block 680.

In block 671, the number of calling station area codes T110 is established. Block 671 then transfers control to block 680.

In block 680, the results of the above blocks are combined to obtain a measure of the probability of mis-routing of calls.

A measure of the probability of arbitrage is based upon the combinations of characteristics that are present. Once suspected, SS7 call detail records are randomly chosen and compared with billing records to confirm arbitrage. Once arbitrage is confirmed, the characteristics of known arbitrators can be further refined.

7.2 Multi-Carrier:

The multi-carrier approach to arbitrage detection relies on the creation of "traffic profiles" associated with each of the interconnecting carriers. These traffic profiles contain historical traffic information including the daily, weekly and monthly amount of traffic; traffic distribution in both directions as a function of the hour of the day; traffic distribution by switching office and or by trunk groups, etc.

Figure 7:
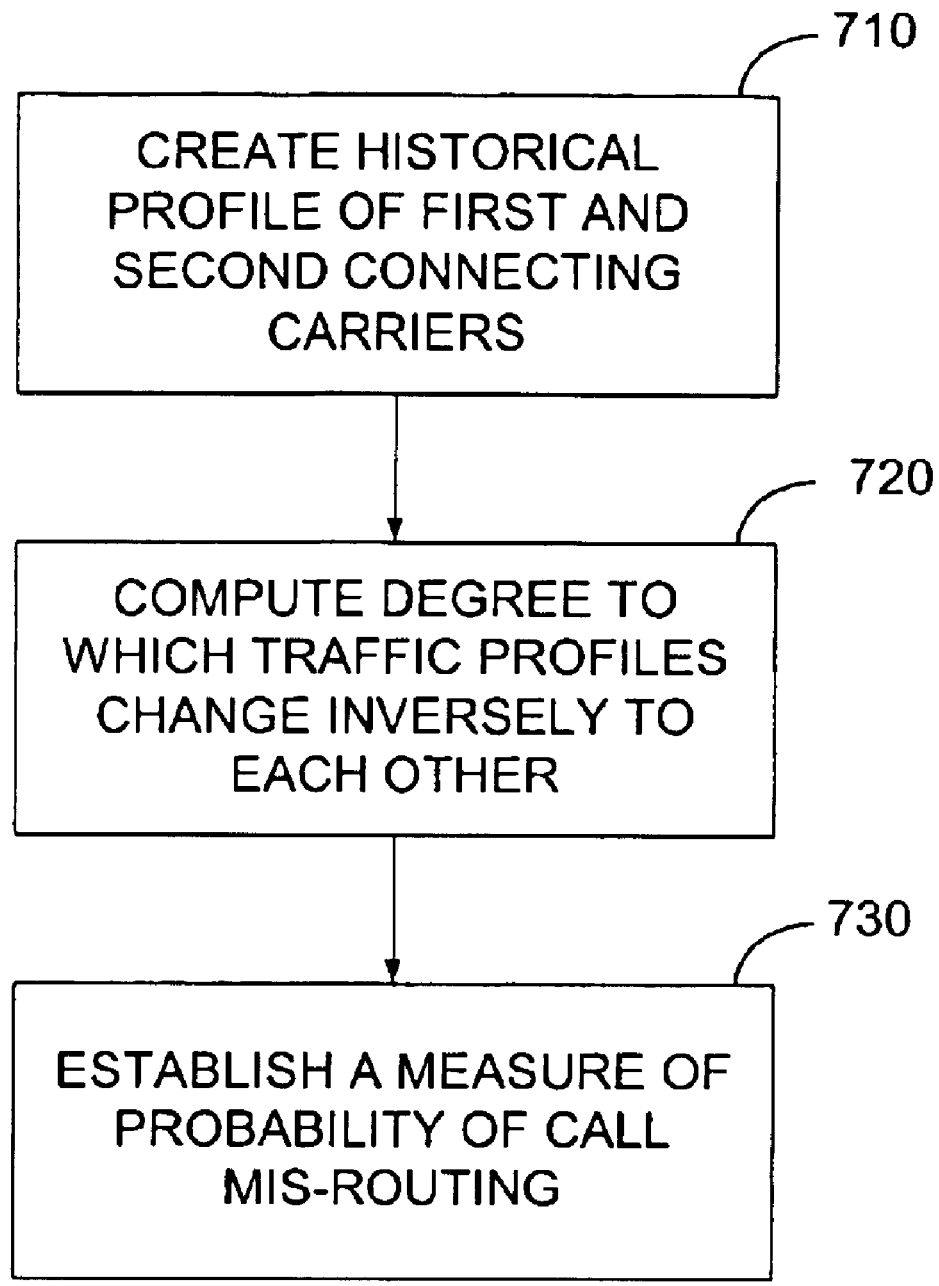
FIG. 7 is a flow chart of another method for establish the probability of arbitrage in the telephone or similar communication system as described in various representative embodiments of the present patent document.

FIG. 7 is a flow chart of another method for establishing a probability of arbitrage in the telephone or similar communication system 100 as described in various representative embodiments of the present patent document. In block 710 a historical profile of first and second connecting carriers 330 is created, wherein first and second carriers 330 connect to the same local area exchange 325. Block 710 then transfers control to block 720.

In block 720 the degree to which traffic profiles change inversely to each other is computed. Block 720 then transfers control to block 730.

In block 730 a measure of probability of call mis-routing is established based on the results of block 720.

Arbitrage may be suspected whenever the traffic profiles of two or more carriers change in ways inversely proportional to each other, suggesting the redirection of traffic from one carrier to another Once suspected, SS7 call detail records can be analyzed in further detail to confirm the arbitrage.

8. Concluding Remarks:

Previous methods for the determination of telephone traffic mis-routing have proven to be ineffective in determining the presence of arbitrage and to be often lacking in accuracy for billing purposes due in large part to limitations in the data that they use. Embodiments disclosed in the present patent document overcome these limitations by collecting call detail records from various points in the telephone system, correlating these records, and then analyzing them. Such techniques have a greatly enhanced probability of probability of detecting arbitrage and billing accuracy. Call detail records T100 missing data can be enriched by data from related records T10 in the correlation process.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiment that remain within the scope of the appended claims.

TABLE 1

| Message | Parameter | Description |
| --- | --- | --- |
| initial address message (IAM) | | INITIAL ADDRESS MESSAGE |
| | Origination Point Code (OPC) | The SS7 node (e.g. switching office or STP) that is sending the message [T130] |
| | Destination Point Code (DPC) | The SS7 node (e.g. switching office or STP) that the message is being sent to [T160] |
| | Calling Number | The calling number of the user making the call [T110] |
| | Charge Number | The charge number of the user making the call [T120] |
| | Called Number | The number dialed by the user [T170] |

TABLE 1-continued

| Message | Parameter | Description |
| --- | --- | --- |
| | Carrier Identification Code | The IXC selected by the user (e.g. via 1010XXX) |
| | Forward Interworking Parameter [T140] | An indicator as to whether SS7 or non-SS7 interworking was encountered prior to this point in the call |
| address complete message (ACM) | | ADDRESS COMPLETE MESSAGE |
| | OPC/DPC | As above |
| | Backward Interworking Parameter [T150] | An indicator as to whether SS7 or non-SS7 interworking was encountered ahead of this point in the call |
| answer message (ANM) | | ANSWER MESSAGE |
| | OPC/DPC | As above |
| release message (REL) | | RELEASE MESSAGE |
| | OPC/DPC | As Above |
| | Release Cause Code | An indication of the status of the call (e.g. answered, busy) |
| release complete message (RLC) | | RELEASE COMPLETE MESSAGE |
| | OPC/DPC | As above |

T100

TABLE 2

| | |
| --- | --- |
| initial address message (IAM) timestamp [T210] | The time the trunk was seized |
| address complete message (ACM) timestamp | The time the called telephone began ringing |
| answer message (ANM) timestamp [T230] | The time the called telephone was answered |
| release message (REL) timestamp [T220] | The time the first of either the called or calling telephone was hung up. |
| Release complete message (RLC) timestamp | The time the second of the called or calling telephone was hung up. |

What is claimed is:

1. A computer operable method for correlating call data records in a telephone system, comprising the steps of:

selecting a first and second call records, providing the call records comprise call characteristic information created in the telephone system and providing the call records identify same called station; and establishing whether first and second call records are correlated.

2. A computer operable method as recited in claim 1, providing selected first and second call records arrive at a central data repository within a first time difference.

3. A computer operable method as recited in claim 1, providing when an originating point code of first and second call records is used to establish whether the call records are correlated, wherein the originating point code identifies an origination signaling transfer point having capability of transferring call set-up messages between two signaling path segments, the method step for establishing whether the first and second call records are correlated comprises:

when the originating point codes of first and second call records are different, identifying first and second call records as uncorrelated;
otherwise,
identifying first and second call records as correlated.

4. A computer operable method as recited in claim 1, providing when a destination point code of first and second call records is used to establish whether the call records are correlated, wherein the destination point code identifies a destination signaling transfer point having capability of transferring call set-up messages between two signaling path segments, the method step for establishing whether the first and second call records are correlated comprises:
when the destination point codes of first and second call records are different,
identifying first and second call records as uncorrelated;
otherwise,
identifying first and second call records as correlated.

5. A computer operable method as recited in claim 1, providing first and second call data records are members of a group of call data records whose arrival at the central data repository was after a first preselected time and before a second preselected time.

6. A computer operable method as recited in claim 1, providing first and second call data records are members of a group of call data records whose called numbers have an identical value in at least one preselected digit position.

7. A computer operable method as recited in claim 1, the method steps further comprising:
when the first and second data records are identified as correlated,
copying at least one data field from the first data record to the second data record.

8. A computer operable method as recited in claim 1, the method steps further comprising:
when the first and second data records are identified as correlated,
copying at least one data field from the second data record to the first data record.

9. A computer operable method as recited in claim 1, wherein the method step for establishing whether the first and second call records are correlated comprises:
when first and second call records are identified as correlated and a third timestamp included with first and second call records is used to establish correlation of first and second call records,
subtracting the third timestamp of the first call record from the third timestamp of the second call record, wherein third timestamp is the time of a call connect signal; and
when the absolute value of the result of third timestamp subtraction method step is greater than a third preselected value,
identifying first and second call records as uncorrelated;
when first and second call records are identified as correlated, the identity of a calling station included in first and second call records is used to establish correlation of first and second call records, and when the call records identify different calling stations,
identifying first and second call records as uncorrelated;
when first and second call records are identified as correlated, the charge number of the calling station included in first and second call records is used to establish correlation of first and second call records, and when the call records identify different charge numbers,
identifying first and second call records as uncorrelated; and
when first and second call records are identified as correlated, the jurisdiction of the call included in first and second call records is used to establish correlation of first and second call records, and when the call records identify different jurisdictions,
identifying first and second call records as uncorrelated.

10. A computer operable method as recited in claim 1, wherein the method step for establishing whether the first and second call records are correlated comprises:
subtracting a first timestamp included with the first call record from first timestamp included with the second call record, wherein first timestamp is time of a call initiation signal;
when the absolute value of the result of first timestamp subtraction method step is greater than a first preselected value,
identifying first and second call records as uncorrelated;
otherwise,
identifying first and second call records as correlated; and
when first and second call records are identified as correlated and a second timestamp included with first and second call records is used to establish correlation of first and second call records,
subtracting the second timestamp of the first call record from the second timestamp of the second call record, wherein second timestamp is the time of a first party disconnect signal; and
when the absolute value of the result of second timestamp subtraction method step is greater than a second preselected value,
identifying first and second call records as uncorrelated.

11. A computer program storage medium readable by a computer, tangibly embodying a computer program of instructions executable by the computer to perform method steps for correlating call data records in a telephone system, the steps comprising:
selecting a first and second call records, providing the call records comprise call characteristic information created in the telephone system and providing the call records identify same called station; and
establishing whether first and second call records are correlated.

12. A computer program storage medium as recited in claim 11, wherein selected first and second call records arrive at a central data repository within a first time difference.

13. A computer program storage medium as recited in claim 11, wherein when an originating point code of first and second call records is used to establish whether the call records are correlated, wherein the originating point code identifies an origination signaling transfer point having capability of transferring call set-up messages between two signaling path segments, the method step for establishing whether the first and second call records are correlated comprising:
when the originating point codes of first and second call records are different,
identifying first and second call records as uncorrelated;
otherwise,
identifying first and second call records as correlated.

14. A computer program storage medium as recited in claim 11, wherein when a destination point code of first and second call records is used to establish whether the call records are correlated, wherein the destination point code identifies a destination signaling transfer point having capability of transferring call set-up messages between two signaling path segments, the method step for establishing whether the first and second call records are correlated comprising:

when the destination point codes of first and second call records are different,
identifying first and second call records as uncorrelated;
otherwise,
identifying first and second call records as correlated.

15. A computer program storage medium as recited in claim 11, wherein first and second call data records are members of a group of call data records whose arrival at the central data repository was after a first preselected time and before a second preselected time.

16. A computer program storage medium as recited in claim 11, wherein first and second call data records are members of a group of call data records whose called numbers have an identical value in at least one preselected digit position.

17. A computer program storage medium as recited in claim 11, the method steps further comprising:
when the first and second data records are identified as correlated,
copying at least one data field from the first data record to the second data record.

18. A computer program storage medium as recited in claim 11, the method steps further comprising:
when the first and second data records are identified as correlated,
copying at least one data field from the second data record to the first data record.

19. A computer program storage medium as recited in claim 11, the step for establishing whether the first and second call records are correlated comprising:
when first and second call records are identified as correlated and a third timestamp included with first and second call records is used to establish correlation of first and second call records,
subtracting the third timestamp of the first call record from the third timestamp of the second call record, wherein third timestamp is the time of a call connect signal; and
when the absolute value of the result of third timestamp subtraction method step is greater than a third preselected value,
identifying first and second call records as uncorrelated;
when first and second call records are identified as correlated, the identity of a calling station included in first and second call records is used to establish correlation of first and second call records, and when the call records identify different calling stations,
identifying first and second call records as uncorrelated;
when first and second call records are identified as correlated, the charge number of the calling station included in first and second call records is used to establish correlation of first and second call records, and when the call records identify different charge numbers,
identifying first and second call records as uncorrelated; and
when first and second call records are identified as correlated, the jurisdiction of the call included in first and second call records is used to establish correlation of first and second call records, and when the call records identify different jurisdictions,
identifying first and second call records as uncorrelated.

20. A computer program storage medium as recited in claim 11, the step for establishing whether the first and second call records are correlated comprising:
subtracting a first timestamp included with the first call record from first timestamp included with the second call record, wherein first timestamp is time of a call initiation signal;
when the absolute value of the result of first timestamp subtraction method step is greater than a first preselected value,
identifying first and second call records as uncorrelated;
otherwise, identifying first and second call records as correlated; and
when first and second call records are identified as correlated and a second timestamp included with first and second call records is used to establish correlation of first and second call records,
subtracting the second timestamp of the first call record from the second timestamp of the second call record, wherein second timestamp is the time of a first party disconnect signal; and
when the absolute value of the result of second timestamp subtraction method step is greater than a second preselected value,
identifying first and second call records as uncorrelated.

* * * * *